US008867199B2

(12) United States Patent
Daley, III

(10) Patent No.: US 8,867,199 B2
(45) Date of Patent: *Oct. 21, 2014

(54) BAG COMPUTER TWO PANEL PROPPING COMPUTER

(76) Inventor: Charles A. Daley, III, Rawai (TH)

( * ) Notice: Subject to any disclaimer, the term of this patent is extended or adjusted under 35 U.S.C. 154(b) by 309 days.

This patent is subject to a terminal disclaimer.

(21) Appl. No.: 13/374,252

(22) Filed: Dec. 19, 2011

(65) Prior Publication Data

US 2012/0106055 A1 May 3, 2012

Related U.S. Application Data

(63) Continuation-in-part of application No. 12/927,884, filed on Nov. 30, 2010, now Pat. No. 8,605,415.

(60) Provisional application No. 61/335,126, filed on Jan. 4, 2010.

(51) Int. Cl.
*G06F 1/16* (2006.01)

(52) U.S. Cl.
CPC ...................................... *G06F 1/163* (2013.01)
USPC ...................................................... 361/679.03

(58) Field of Classification Search
None
See application file for complete search history.

(56) References Cited

U.S. PATENT DOCUMENTS

| | | | | |
|---|---|---|---|---|
| 5,217,119 A | * | 6/1993 | Hollingsworth | 206/583 |
| 5,222,642 A | * | 6/1993 | Solarz | 224/191 |
| 5,445,266 A | * | 8/1995 | Prete et al. | 206/320 |
| 5,494,157 A | * | 2/1996 | Golenz et al. | 206/320 |
| 5,678,666 A | * | 10/1997 | Shyr et al. | 190/102 |
| 5,774,338 A | * | 6/1998 | Wessling, III | 361/730 |
| 5,887,723 A | * | 3/1999 | Myles et al. | 206/760 |
| 5,887,777 A | * | 3/1999 | Myles et al. | 224/578 |
| 5,908,147 A | * | 6/1999 | Chuang | 224/607 |
| 6,105,764 A | * | 8/2000 | Scicluna et al. | 206/320 |
| 6,161,738 A | * | 12/2000 | Norris | 224/153 |
| 6,283,299 B1 | * | 9/2001 | Lee | 206/760 |
| 6,393,745 B1 | * | 5/2002 | Miki | 40/586 |
| 6,597,568 B2 | * | 7/2003 | Ryder | 361/679.55 |
| 6,685,016 B2 | * | 2/2004 | Swaim et al. | 206/320 |
| 6,763,942 B1 | * | 7/2004 | Yeh | 206/320 |
| 6,769,588 B2 | * | 8/2004 | Zheng | 224/576 |
| 6,883,693 B2 | * | 4/2005 | Han | 224/576 |
| 6,956,614 B1 | * | 10/2005 | Quintana et al. | 348/373 |
| 6,962,277 B2 | * | 11/2005 | Quintana et al. | 224/262 |
| 6,986,447 B2 | * | 1/2006 | Truong | 224/275 |
| 7,265,970 B2 | * | 9/2007 | Jordan | 361/679.27 |
| 7,821,779 B2 | * | 10/2010 | Daley, III | 361/679.02 |
| 7,876,558 B2 | * | 1/2011 | Daley, III | 361/679.55 |
| 7,881,048 B2 | * | 2/2011 | Daley, III | 361/679.03 |
| 7,889,496 B2 | * | 2/2011 | Daley, III | 361/679.55 |
| 7,894,179 B2 | * | 2/2011 | Daley, III | 361/679.03 |

(Continued)

*Primary Examiner* — Lisa Lea Edmonds

(57) ABSTRACT

The disclosed invention is a bag and computer combination where the computing unit is in a panel on the front of the bag. The display panel is pivotally attached near the top front of the bag and pivots to cover the computing unit. The display panel may be held in an operating angular position using a fabric flap or free sections on the display panel side edges to suspend the display panel from the bag while an extension on the display panel temporarily sticks to the computing unit panel. Several ways are described to provide access from the computer to the bag interior. As an alternative, the display panel may be pivotally attached in a similar manner directly to the computing unit panel which is attachable to the bag front. In this arrangement the computer is removable and usable on a desk top or on a wall.

55 Claims, 15 Drawing Sheets

(56) References Cited

U.S. PATENT DOCUMENTS

| | | | |
|---|---|---|---|
| 7,974,081 B2* | 7/2011 | Daley, III | 361/679.03 |
| 7,978,464 B2* | 7/2011 | Daley, III | 361/679.02 |
| 8,014,138 B2* | 9/2011 | Daley, III | 361/679.03 |
| 8,094,440 B2* | 1/2012 | Daley, III | 361/679.03 |
| 8,125,770 B2* | 2/2012 | Daley, III | 361/679.03 |
| 8,194,398 B2* | 6/2012 | Daley, III | 361/679.03 |
| 8,467,176 B2* | 6/2013 | Daley, III | 361/679.03 |
| 8,553,401 B2* | 10/2013 | Daley, III | 361/679.03 |
| 8,559,168 B2* | 10/2013 | Daley, III | 361/679.03 |
| 8,605,415 B2* | 12/2013 | Daley, III | 361/679.03 |
| 8,605,416 B2* | 12/2013 | Daley, III | 361/679.03 |
| 2004/0134813 A1* | 7/2004 | Domotor | 206/320 |
| 2005/0000843 A1* | 1/2005 | Zheng | 206/457 |
| 2005/0011920 A1* | 1/2005 | Feng | 224/275 |
| 2005/0045673 A1* | 3/2005 | Godshaw et al. | 224/153 |
| 2005/0103815 A1* | 5/2005 | Lee et al. | 224/275 |
| 2006/0042996 A1* | 3/2006 | Picot et al. | 206/586 |
| 2006/0144663 A1* | 7/2006 | Gullen et al. | 190/110 |
| 2006/0163303 A1* | 7/2006 | Trutanich | 224/576 |
| 2007/0151881 A1* | 7/2007 | Zheng | 206/320 |
| 2007/0199851 A1* | 8/2007 | Yau | 206/472 |
| 2008/0161753 A1* | 7/2008 | Gillespie et al. | 604/65 |
| 2008/0237250 A1* | 10/2008 | Swansey | 220/756 |
| 2008/0273298 A1* | 11/2008 | Daley | 361/683 |
| 2008/0289886 A1* | 11/2008 | Burkitt | 178/18.03 |
| 2009/0009476 A1* | 1/2009 | Daley, III | 345/168 |
| 2009/0027632 A1* | 1/2009 | Choi | 353/98 |
| 2009/0046416 A1* | 2/2009 | Daley, III | 361/679.55 |
| 2009/0141446 A1* | 6/2009 | Daley, III | 361/679.55 |
| 2009/0185342 A1* | 7/2009 | Daley, III | 361/679.27 |
| 2009/0190296 A1* | 7/2009 | Daley, III | 361/679.27 |
| 2009/0201637 A1* | 8/2009 | Daley, III | 361/679.29 |
| 2009/0225508 A1* | 9/2009 | Daley, III | 361/679.27 |
| 2009/0284908 A1* | 11/2009 | Daley, III | 361/679.17 |
| 2010/0050485 A1* | 3/2010 | Forte et al. | 40/1.5 |
| 2010/0219221 A1* | 9/2010 | Zheng | 224/576 |
| 2010/0256561 A1* | 10/2010 | Gillespie et al. | 604/151 |
| 2011/0032669 A1* | 2/2011 | Daley, III | 361/679.03 |
| 2011/0051362 A1* | 3/2011 | Daley, III | 361/679.55 |
| 2011/0102992 A1* | 5/2011 | Daley, III | 361/679.03 |
| 2011/0164366 A1* | 7/2011 | Daley, III | 361/679.03 |
| 2011/0304965 A1* | 12/2011 | Daley, III | 361/679.03 |
| 2011/0304970 A1* | 12/2011 | Daley, III | 361/679.26 |
| 2012/0008261 A1* | 1/2012 | Daley, III | 361/679.01 |
| 2012/0106055 A1* | 5/2012 | Daley, III | 361/679.03 |
| 2012/0275102 A1* | 11/2012 | Daley, III | 361/679.03 |
| 2013/0301198 A1* | 11/2013 | Daley, III | 361/679.03 |

* cited by examiner

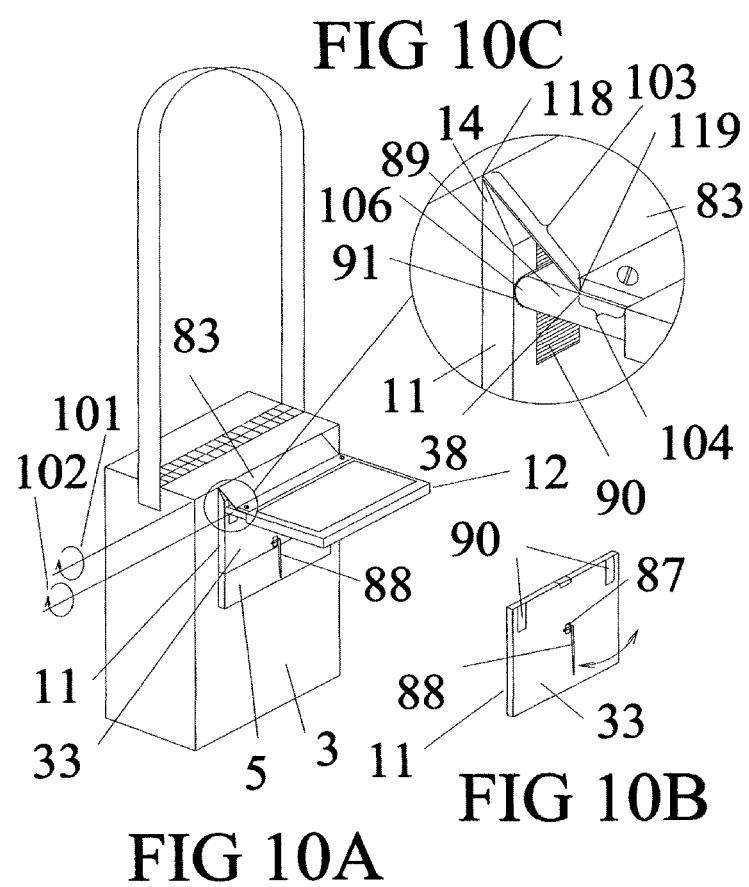

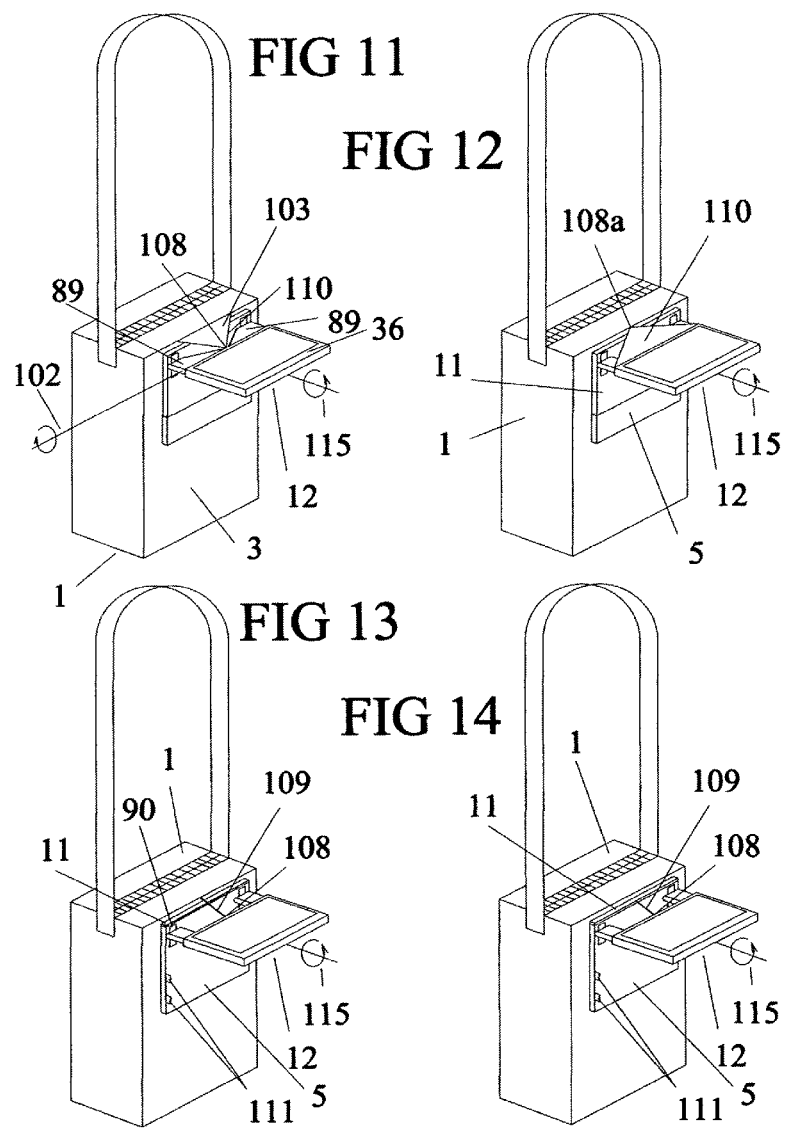

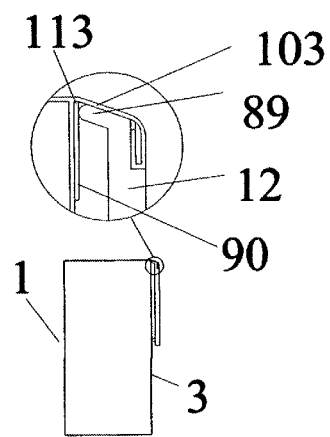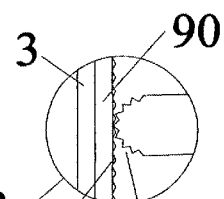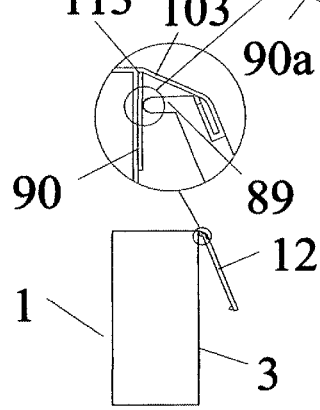
FIG.16B
FIG.16A
FIG.17C
FIG.17B
FIG.17A

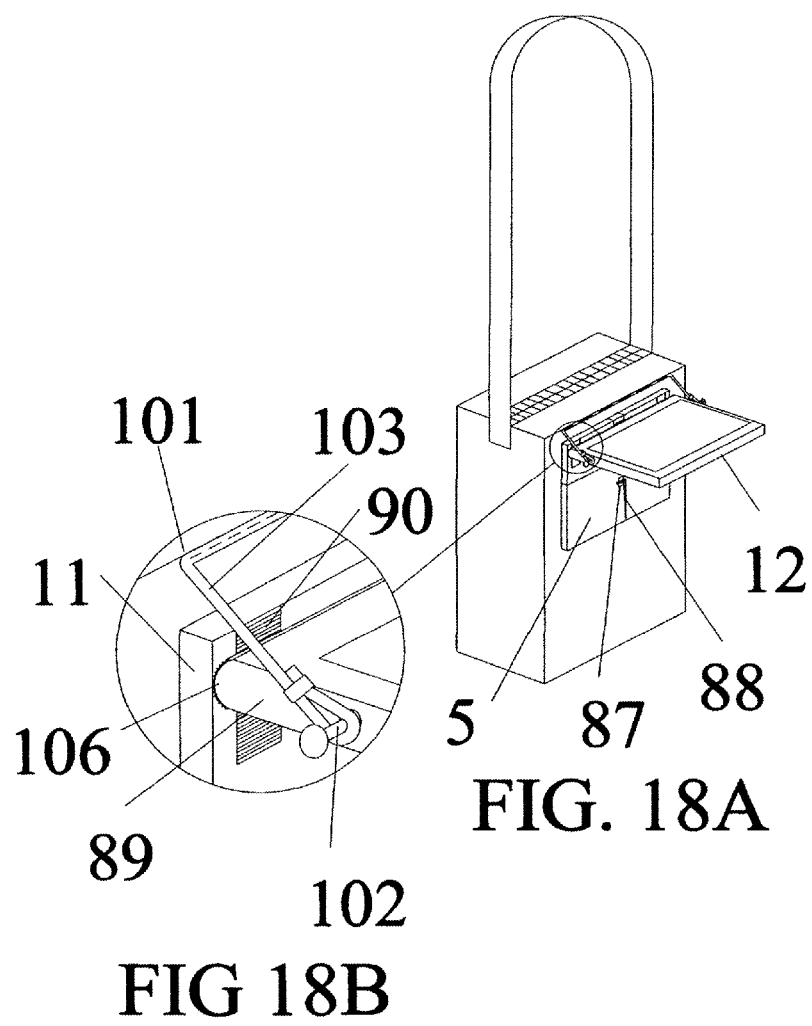

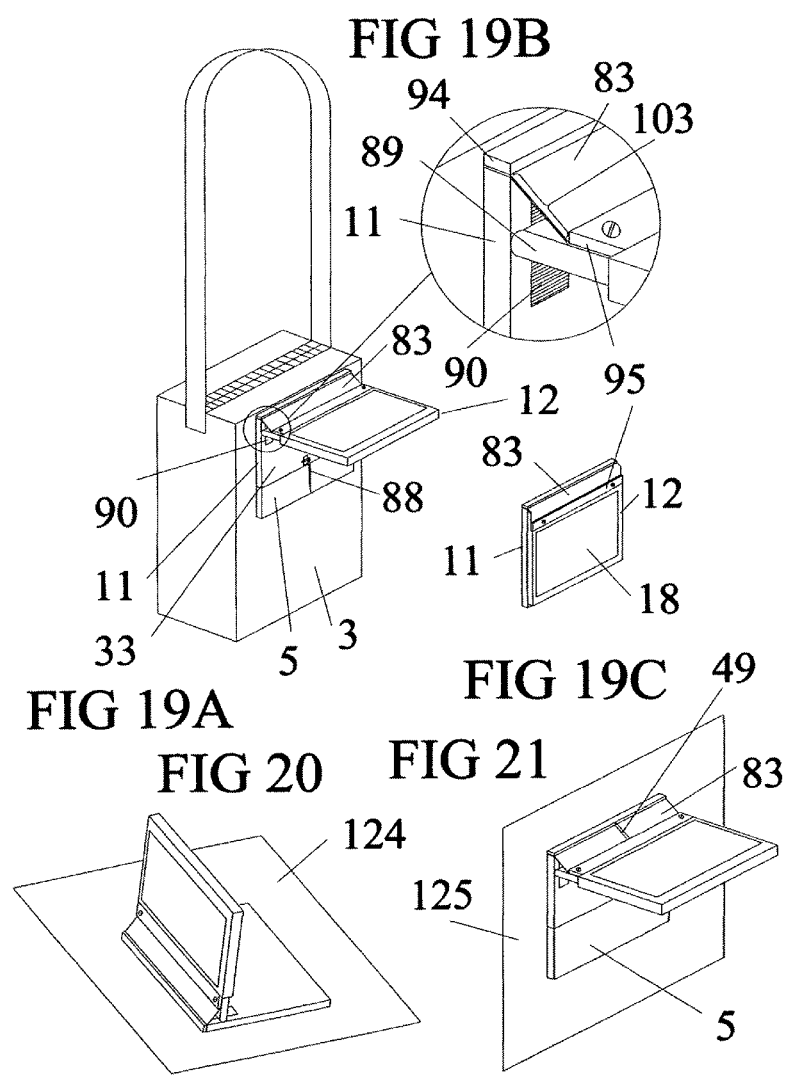

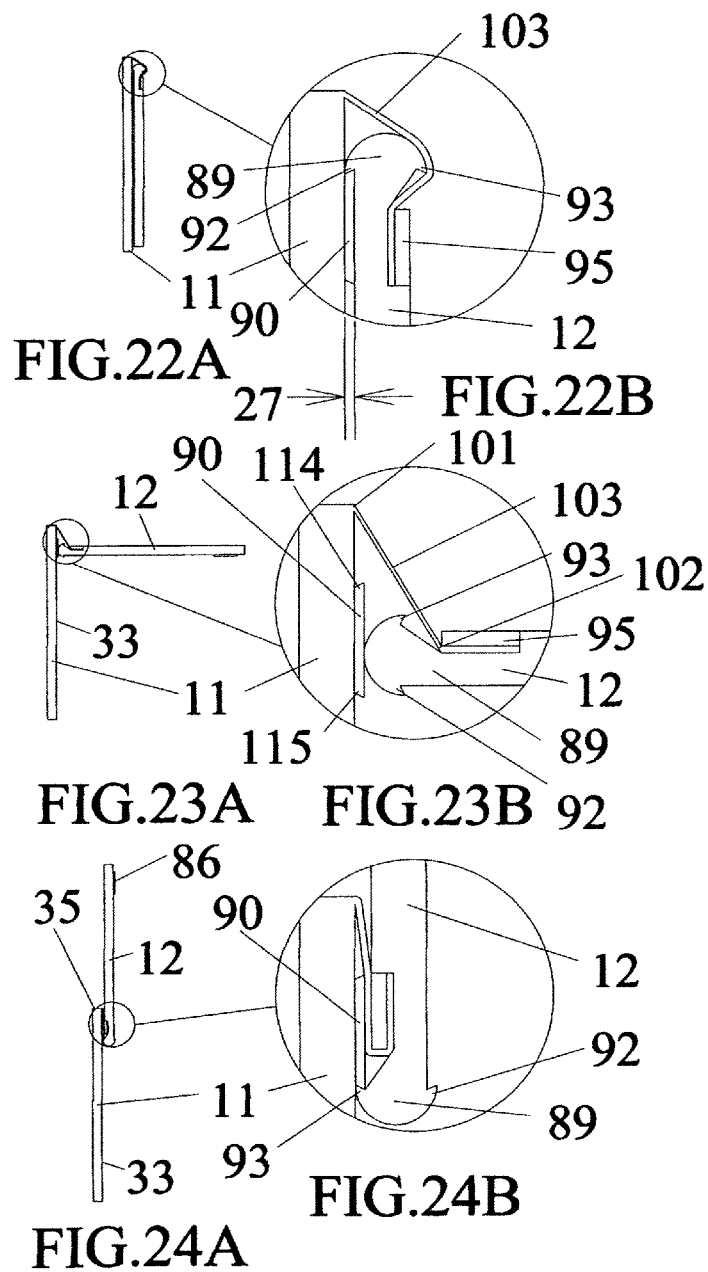

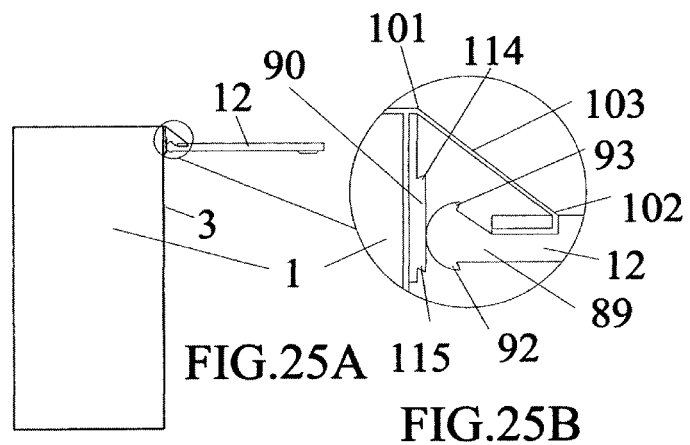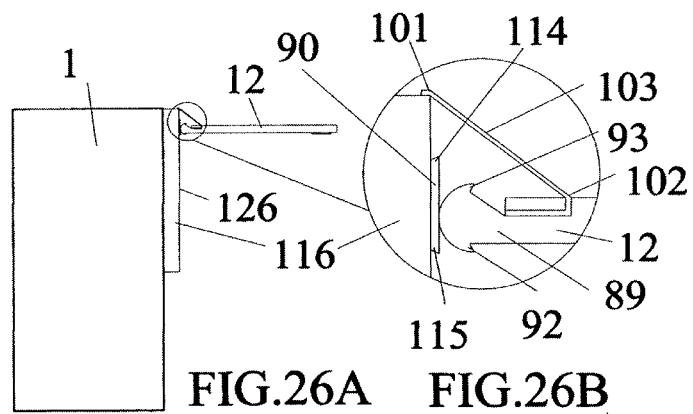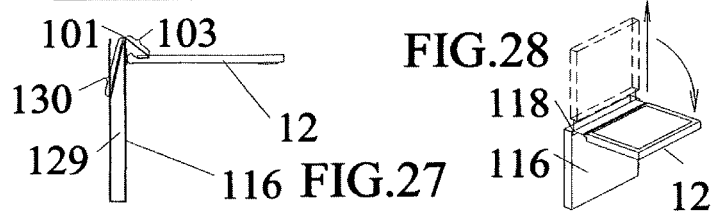

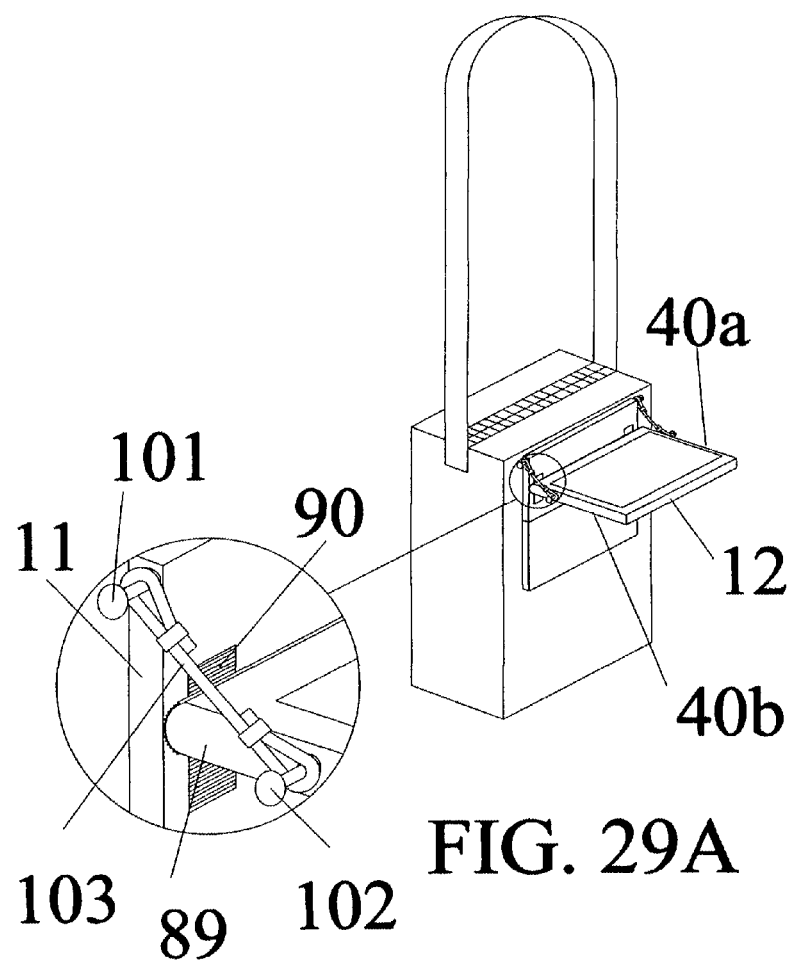

FIG. 30A 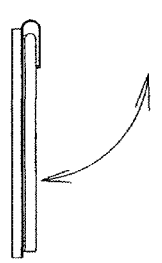 FIG. 30B 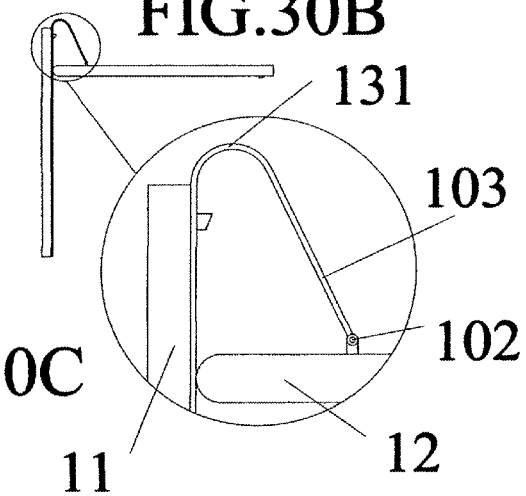
FIG. 30C
FIG. 31A 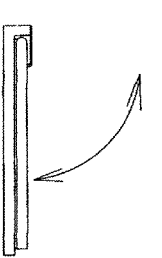 FIG. 31B 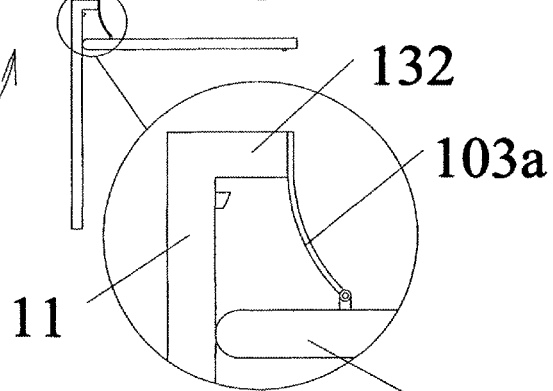
FIG. 31C

BAG COMPUTER TWO PANEL PROPPING COMPUTER

CROSS-REFERENCE TO RELATED APPLICATIONS

This application is a Continuation-In-Part of U.S. copending patent application Ser. No. 12/927,884, filed on Nov. 30, 2010. The disclosure of this U.S. patent application is incorporated herein by reference.

This application claims the filing benefit under 35 U.S.C. §119(e) of U.S. Provisional Application No. 61/460,500 filed on Jan. 4, 2011, the entire teachings of which are incorporated herein by reference.

TECHNICAL FIELD

The present invention relates to bag mounted computer equipment designed for use in a mobile environment.

BACKGROUND OF THE INVENTION

The use of computers has become widespread and computers have replaced may other forms of communication and information storage and retrieval. Access to computers, even while moving about, has become essential to modern life.

Standardization in computer software and some computer components has become important so that computer operation needn't be relearned in every situation. Thus, the standards on a desk top computer are also desired in the mobile environment.

Several obstacles exist in current equipment used for mobile computing: Small displays are not capable of standard internet format or Windows operating systems: Small keyboards are not capable of two hand typing: Small computer bodies and surfaces not capable of servicing the necessary computing ability, batteries and input/output electrical connections.

There has been work to miniaturize lap top computers but these attempts are limited by necessary display and keyboard size and, in any case, these computers remain essentially made for use on a table top. If a standard display is desired, a separate carrying case or bag must be used, set up time limits usefulness and separate components can be dropped or left behind.

The scenario where a computing unit panel is attached to the inside of a bag front wall creating a rigid venue for the storage of a display panel pivotally attached to bag and stored on the outside of the same front wall has already been presented (application Ser. No. 12/458,917). However, the computing unit panel may also be mounted to the outside of the bag wall and an angular support assembly (application Ser. No. 12/927,884) may be applied to this situation. Also already presented is the situation where the display panel is pivotally attached directly to the computing unit panel instead of the bag and the computing unit is mountable to the bag front (application Ser. No. 12/383,784). However, the angular support assembly is not included in this invention. To improve and combine these feature the present invention included a computing unit panel on the bag front with an angular support assembly connecting the display panel to either the bag or the computing unit panel.

Several other previous bag computer inventions are related to the current invention. The following US patent applications have addressed the design of bag computers:

| publication # | application # |
|---|---|
| 20070201201 | 11/796,920 |
| 20070199844 | 11/799,011 |
| 20090009476 | 12/004,637 |
| 20090009938 | 12/074,115 |
| 20090046416 | 12/216,650 |
| 20080273298 | 12/216,651 |
| 20080192421 | 12/079,753 |
| 20090185342 | 12/383,784 |
| 20090190296 | 12/384,419 |
| 20090141446 | 12/322,282 |
| 20090201637 | 12/384,952 |
| 20090225509 | 12/387,594 |
| 20090225508 | 12/454,327 |
| 20090284908 | 12/458,917 |
| 20100220434 | 12/584,304 |
| 20110164366 | 12/927,884 |
|  | 13/135,446 |

BRIEF SUMMARY OF THE INVENTION

The bag computer may be described as having a pivoting display panel near the top of the front wall which pivots into a storage area on the front wall. It may be covered with a cover. The display panel is in storage position against the bag front and in operating positions in other angular positions relative to the bag front wall where an operator may view and use it.

The display panel may be removably attached to the bag and may be electrically connected to the inside of the bag or to a computing unit panel. The display panel may have a touch screen or a back side pointing device with finger guides. The computing unit panel may be attached to the outside of the bag front in the computer equipment storage area, and a holder may be used for this purpose.

To supply computer equipment and electrical connection access to the bag interior, the bag and computing unit panel may form an interior access coupling of several types: 1) there may be an opening in the bag front wall with a coupling to match a coupling on the computing unit panel; 2) the computing unit panel may be divided into front and back parts which fasten together through the bag front wall; 3) there may be a connection box on the inside of the bag front wall which electrically connects with the computing unit panel on the outside of the front wall.

The bag computer may be supplied with a display panel angular support assembly to hold the display panel in various angular positions relative to the bag front. Using a prop or extension fixed to the edge of the display panel along with a free section and, optionally, a contact surface, the display panel may be propped in various positions. The prop temporarily adheres to the bag front or contact surface while the free section suspends the display panel. Placing the prop in different places on the bag front or computing unit panel regulates the display panel angle. The computing unit panel, held to the front wall with a holder, cooperates with the separately mounted display panel.

The free section may be an attachment flap which may attach to the display panel along an attachment axis or may be tapered and attach to a point on the display panel to allow the display panel to pivot on an axis perpendicular to the bag front. The free section may be a filament.

The display panel may be electrically attached to the computing unit panel directly without entering the bag. Alternatively, the display panel electrical connection may pass into the bag interior for connection back to the computing unit panel on the outside of the bag.

The free section of the display panel angular support assembly may be attached to the right and left sides of the display panel allowing the display on the display panel to be positioned also on the prop/extension area.

The free section of the display panel angular support assembly may be attached from the display panel to the computing unit panel instead of to the bag. In this way a two panel computer is formed which is mountable to a bag and also usable in other venues.

The display panel angular support assembly may include matching attachments on the display panel and computing unit panel which may be used to hold the display panel in the storage position or in the vertical operating position.

As alternatives, the display panel angular support assembly may be used with the free section attached to the bag, to the computing unit panel or to a slide-in receptacle for the display panel. These assemblies may also include the attachments to hold the display panel in the storage position or in the vertical operating position.

Parts of the pivoting computer equipment mount, such as the free section or first axis, may be made of spring material to press the extension end into the contact surface.

BRIEF DESCRIPTION OF THE SEVERAL VIEWS OF THE DRAWING

FIG. 10A This is the bag computer with pivoting display panel and computing unit panel an including a display panel angular support assembly.

FIG. 10B This shows details of the computing unit panel removed from the bag.

FIG. 10C This is a magnified view of the display panel angular support assembly area of the bag computer.

FIG. 11 This shows the display panel attached to the bag using a tapered attachment flap attaching to an attachment point on the display panel.

FIG. 12 This shows the display panel attached to the bag using a tapered attachment flap attaching to an attachment point on the bag.

FIG. 13 This shows the display panel attached to the bag using a filament attaching from the bag to an attachment point on the display panel.

FIG. 14 This shows the display panel attached to the computing unit panel using a filament attaching from the computing unit panel to an attachment point on the display panel.

FIG. 16A This is the display panel mounted to the bag in storage position using a display panel angular support assembly.

FIG. 16B This is a magnified view of the display panel angular support assembly while the display panel is in storage position.

FIG. 17A This is the display panel mounted to the bag in an operating position using a display panel angular support assembly.

FIG. 17B This is a magnified view of the display panel angular support assembly while the display panel is in an operating position.

FIG. 17C This is a further magnification of FIG. 17A showing detail of the display panel prop extension in contact with the bag's contact surface.

FIG. 18A This drawing shows the display panel angular support assembly with the free section being filament-like and attached near the display panel side edges.

FIG. 18B This is a magnified view of the display panel angular support assembly shown in FIG. 18A.

FIG. 19A This is a bag computer including a display panel angular support assembly where the free section is attached to the computing unit panel instead of the bag. The computing unit panel is held to the bag with a computing unit panel holder.

FIG. 19B This is a magnified view of the display panel angular support assembly area of the bag computer in FIG. 19A.

FIG. 19C This figure shows the display panel and computing unit panel pivotally attached by the free section and forming a two panel computer with display panel angular support assembly for use on a bag or other venue.

FIG. 20 This figure shows the combined display panel and computing unit panel, as shown on the bag in FIGS. 19A and 19C in use on a table.

FIG. 21 This figure shows the combined display panel and computing unit panel, as shown on the bag in FIGS. 19A and 19C mounted to a wall.

FIG. 22A This is the display panel attached to a computing unit panel using a display panel angular support assembly with free section. An attachment is provided to hold the display panel in storage position.

FIG. 22B This is a magnified view showing detail of the display panel angular support assembly area of FIG. 20A.

FIG. 23A This is the display panel attached to a computing unit panel using a display panel angular support assembly with free section. The display panel is in an operating position perpendicular to the bag front.

FIG. 23B This is a magnified view showing detail of the display panel angular support assembly area of FIG. 21A.

FIG. 24A This is the display panel attached to a computing unit panel using a display panel angular support assembly with free section. An attachment is provided to hold the display panel in a vertical operating position.

FIG. 24B This is a magnified view showing detail of the display panel angular support assembly area of FIG. 22A.

FIG. 25A This is the display panel attached to a bag front wall using a display panel angular support assembly with free section. The display panel is in an operating position perpendicular to the bag front and shows attachments on the bag front and display panel to hold the display panel in a storage position or in a vertical operating position.

FIG. 25B This is a magnified view showing detail of the display panel angular support assembly area of FIG. 23A.

FIG. 26A This is the display panel attached to a slide in display panel receptacle on the bag front wall using a display panel angular support assembly with free section. The display panel is in an operating position perpendicular to the bag front and shows attachments on the bag front and display panel to hold the display panel in a storage position or in a vertical operating position.

FIG. 26B This is a magnified view showing detail of the display panel angular support assembly area of FIG. 24A.

FIG. 27 This is a holder or receptacle with the display panel using the angular support assembly where the holder is separate from the bag. The receptacle or holder is shown in side view cross section.

FIG. 28 This figure shows how the holder or receptacle functions to store the display panel inside the receptacle.

FIG. 29A This is the 2 panel computer with free sections on the display panel side edges mounted to as bag.

FIG. 29B This is a magnification of FIG. 20B computer showing detail of the angular support assembly.

FIG. 30A This is the 2 panel computer with the angular support assembly using a spring in the first axis area. This is storage position.

FIG. 30B This is the 2 panel computer with the angular support assembly using a spring in the first axis area. This is an operating position.

FIG. 30C This is a magnification of FIG. 30B showing detail of the angular support assembly.

FIG. 31A This is the 2 panel computer with the angular support assembly using a spring for the free section. This is storage position.

FIG. 31B This is the 2 panel computer with the angular support assembly using a spring for the free section. This is an operating position.

FIG. 31C This is a magnification of FIG. 31B showing detail of the angular support assembly.

DETAILED DESCRIPTION OF THE INVENTION

Figure 1:
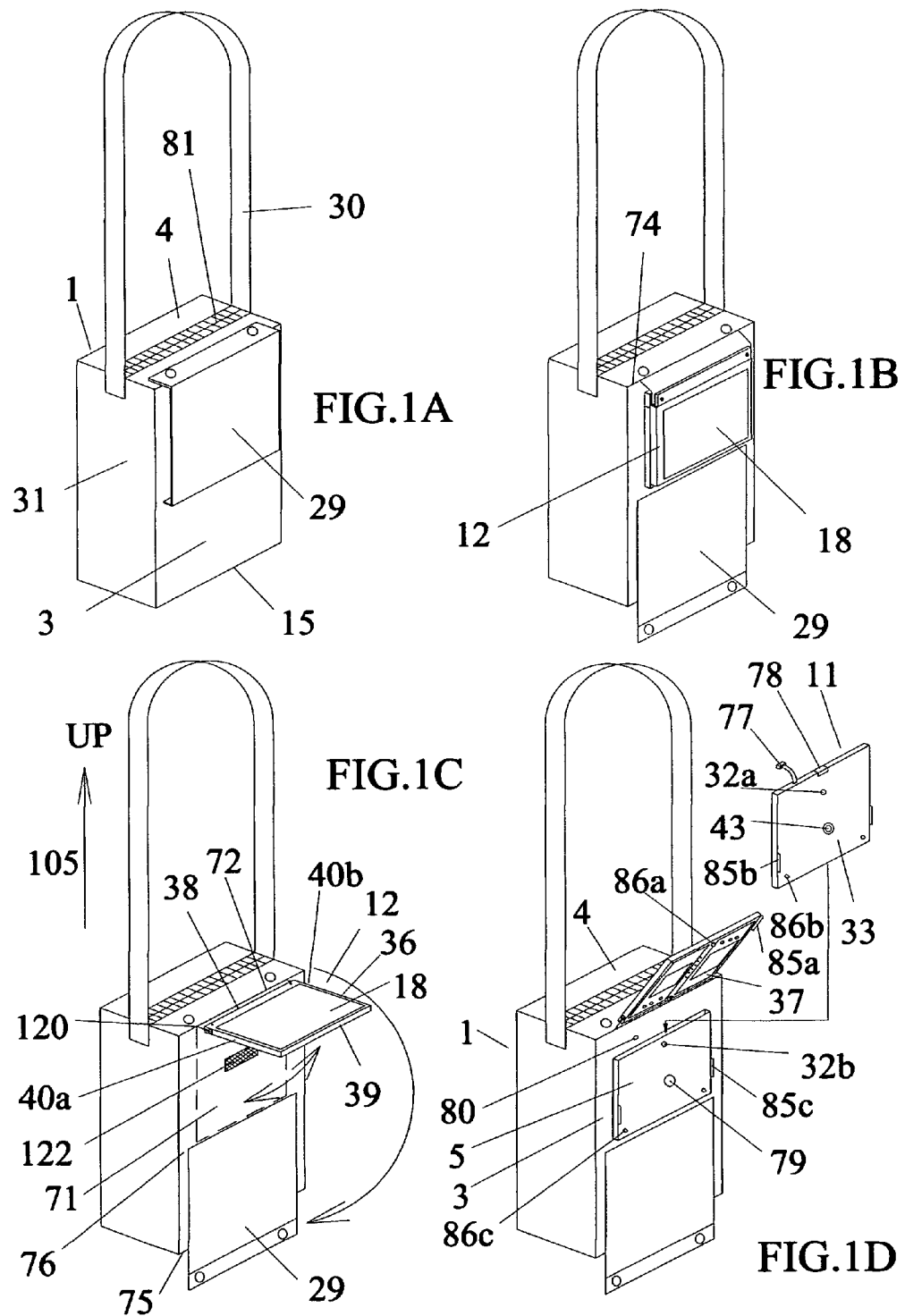
FIG. 1A This is a bag computer with the display panel in stored position and the cover covering the display panel.
FIG. 1B This shows the bag computer with the cover opened.
FIG. 1C This shows the display panel pivoting from storage position into operating position.
FIG. 1D This shows how a computing unit panel can be mounted into the computer equipment storage area using a computing unit panel holder.

FIG. 1A shows the bag computer with the computer equipment stored and covered by a pivoting cover 29 attached to the bag. The bag 1 used in the bag computer has a front wall 3 with outside surface and opposite back wall, several side walls 31 connection the front and back wall, a top wall 4 with opening 81 to access the interior and an opposite bottom wall. The opening would normally have a closure such as a zipper. Each wall has an inside and outside surface. The walls define an interior general cargo storage area for items not attached to the bag's front wall. The bag may have a shoulder strap 30 for carrying the bag and holding the bag in position on the operator for use. The strap may be removable and replaceable. The straps may be repositioned on the bag so the operator may wear the bag as a belly bag.

In FIG. 1B the cover 29 has been pivoted downward to expose the display panel. This is the display panel's storage position with the display panel 12 approximately parallel to the front wall and the display 18 facing away front the bag's front wall. The display is electronic and capable of showing computer generated images. It is pivotally connected to the bag near a junction 74 of the front and top walls.

The computing unit panel is attached to the outside of the front wall in the computer equipment storage area with its back side beside the outside of the bag's front wall and its opposite front wall is facing away from the bag. The display panel is in storage position when the back side of the display panel is beside the computing unit panel and/or the computing unit holder, depending on style of holder.

FIG. 1C shows the bag with the display in an operating position with the display panel display 18 in the line of sight of the bag wearer/computer operator. The display panel pivots at an attachment near the top end 72 of the front wall hear the junction of the top and front walls. The bag front also has a bottom end 75 and a central area. The bag front wall may include a ventilator 122, such as an opening, heat conductor or air permeable material, for computer equipment cooling.

The bag has a computer equipment storage area 71 (outlined in dotted lines) toward the top end 72 of the outside of the bag's front wall and bounded at the computer equipment storage area upper boundary 120 by the attachment of the display panel to the bag. This storage area is for computer equipment when not in use and is of a size and shape for this purpose. The computer equipment storage area may also include a computing unit holder (not shown in this figure— see FIG. 1D) or other computer equipment and the display panel may store over or under this equipment in the computer equipment storage area. The computer equipment storage area may be covered with a cover 29 to protect the equipment when not in use. This cover may be pivotally attached to the bag front and positioned at the bottom 76 of the computer equipment storage area and may be oriented to pivot upward to cover the computer equipment storage area and any equipment in this area or pivot downward to uncover and expose for use any equipment in the computer equipment storage area.

The display panel is pivotally attached to the bag and positioned at the top of the computer equipment storage area and is oriented so that it pivots into and out of the computer equipment storage area. The bag computers display panel 12 is thin and approximately rectangular in shape. The display panel, which may be removable, has a front side 36 facing up 105 when the display panel is an operating position pivoted perpendicular to the bag's front wall, a back side (see 37 in FIG. 1D) opposite the front side, a proximal attachment edge 38 closest to the bag's front wall when it is pivoted perpendicular to the bag's front wall, a distal edge 39 opposite the proximal edge, a right side edge 40a and a left side edge 40b. With the attachment of the display panel to the bag on or near the attachment edge, the back side of the display panel is available to the operator's fingers for the use of controls found there. The display 18 is located on the display panel front side and oriented for viewing by the wearer when pivoted away from the bag's front wall into operating position.

In FIG. 1D the display panel is tilted up so the computer equipment storage area can be seen. The computing unit panel 11 (CU panel), removed and shown to the far right, is attached to the bag in the computer equipment storage area when the bag computer is assembled. The computing unit panel may include a computing unit, batteries, navigation equipment, such as GPS, telecommunications equipment, or radio equipment. The CU panel may serve as a rigid support for the front wall and facilitate the storage of the display panel in the computer equipment storage area. The computing unit panel may include no electronics and be used only for mounting and supporting the display panel. The computing unit panel may include an electrical connection leading to other computer equipment on the bag. The connection may also lead to batteries or peripherals in the interior of the bag. This electrical connection may be a plug or socket 77 with wire lead or a socket 78. The computing unit panel may also include a tool 43, such as a camera. The computing unit panel may also include a keeper 32*a* designed to secure the panel in the holder and keep the computing unit panel in the holder.

In the bag's computer equipment storage area there may be a computing unit panel holder 5. The holder may be a holster, pockets, bracket, matching attachments or other means to hold the computing unit panel to the bag. The holder and interior access coupling of any sort may be combined to serve the purpose of both holding the computing unit panel to the bag and providing access between the computing unit panel and the interior of the bag. The holder or the bag may include a keeper 32*b* to secure the CU panel in the holder and this keeper may match a fixture on the CU panel, the bag, the keeper or the holder. The holder may include an opening 79 matching a tool on the computing unit panel.

The bag front may include one or more electrical access openings 80 to allow electrical connection to equipment, batteries or peripheral inside the bag.

It can be seen from FIGS. 1B and 1D that the display panel, when in storage position, is parallel to and next to the computing unit panel and/or its holder. The computing unit panel is shaped, sized and located to act as a rigid support for the front wall and provide a solid surface to store the display panel against. The computing unit panel front side 33 and display panel back side 37 are compatibly formed to assist in storing the display panel in the storage position. With the tendency of the bag front to bulge under heavy loads, the rigidity of the computing unit panel assists and assures that the display panel store properly. Although the computing unit panel would normally form a flat surface for the display panel to store against, its surface may be curved in any way to match the back side of the display panel and assist storing the display panel to the bag and against the computing unit panel. There may be alignment structures 85*a* on the display panel or alignment structures 82*b* on the computing unit panel or alignment structures 85*c* on the holder to assure proper display panel storage. The display panel, computing unit panel or holder may include bumpers to absorb shock between the two panels (86*a*, 86*b* and 86*c* respectively).

Figure 2:
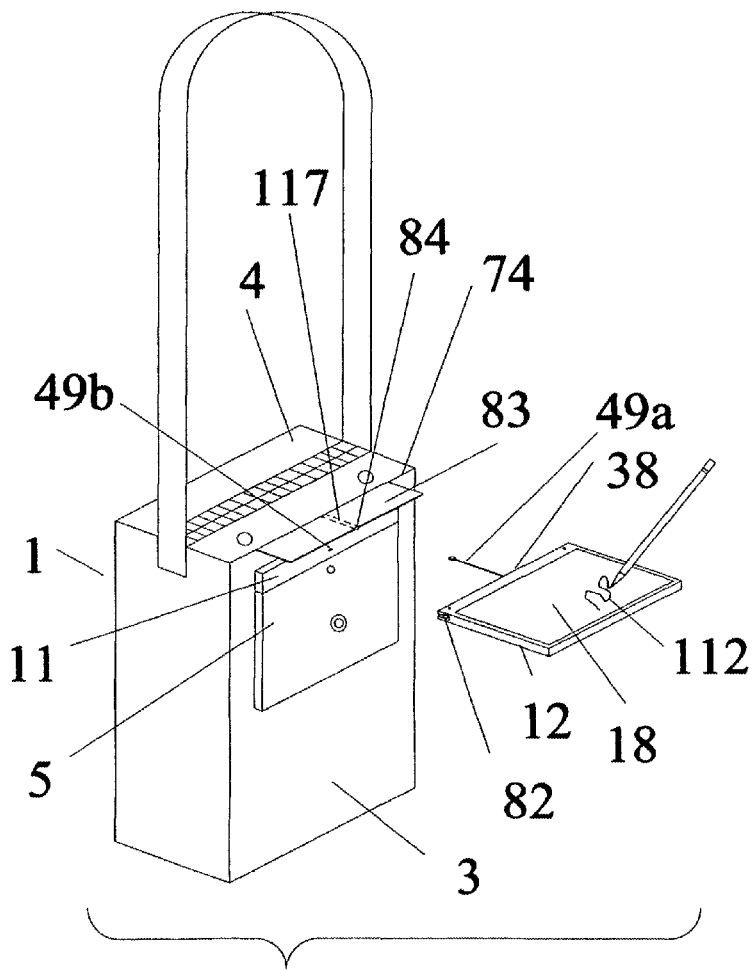
FIG. 2 Shown here are details how the display panel can be removably mounted to the bag.

FIG. 2 shows the bag computer with the computing unit panel 11 in the computing unit panel holder 5. The display panel 12 may include controls and includes a display 18 which may include a touch screen 112 (shown as stylus markings on display). The drawing shows that the display panel may be removable from the bag 1. The display panel may include a computing unit, batteries and/or other electronic equipment. This equipment may be located toward the attachment edge of the display panel to also act as a counter weight to the remainder of the display panel. The display panel is attached to the bag with a Pivoting Computer Equipment Mount (PCEM) which allows pivotal and removable attachment and which may be comprise of two parts; the display panel part PCEM and the bag part PCEM. The PCEM may also be called a retainer because it retains the display panel to the bag. The display panel may have a display panel part PCEM 82 and this matched the bag part PCEM 83 on the bag to pivotally join the bag and display panel. The PCEM parts may be or include a hinge, hinge parts, attachment flap, clamp, two jaws, fabric loop, axle, bearing or any other arrangement which attaches the display panel to the bag and allows it to pivot. An attachment flap may be made of clothe, bag materiel, leather, rubber sheet or other flexible sheet-like material. The attachment flap may be stretchable and elastic. Pivoting is along an axis approximately parallel to the junction 74 of the front and top walls near the top end of the front wall.

The display panel may include an electrical connection 49*a* to connect the display panel with other computer equipment mounted to the bag or with electrical equipment or batteries stored inside the bag. The electrical connection may be located near the attachment edge 38. The electrical connection may also lead to the bag's interior using an electrical access opening in the front wall. The electrical connection may be a wire and plug, plug, socket or other means. Electrical connection may also be included in the bag, for example, as part of the bag part pivoting computer equipment mount. An opening 84 may be incorporated in an attachment flap as, for example, an opening or channel 117 (dotted lines) between two layers of the flap and thus through an electrical access opening in the front wall. The opening or channel may instead open before passing to the inside of the bag and attach to the CU panel without entering the bag. There may be an electrical connection directly from the display panel to the CU panel without using the attachment flap with, for example, the connection 49*a* from the display panel connecting to a connection on the CU panel 49*b*.

Figure 3:
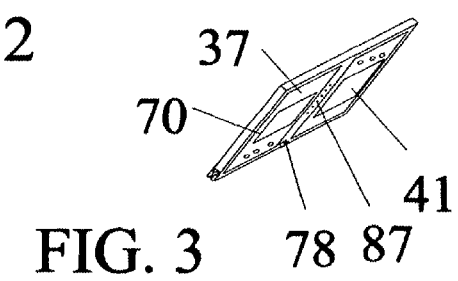
FIG. 3 This shows the detail of the back side of the display panel.

In FIG. 3 the display panel is tilted up so the computer equipment storage area can be seen. The back side 37 of the display panel may have controls 41, such as a pointing device, touch pad, button, switch, etc. The controls may include finger guides 70 to assist in locating the control while it is not in view. The electrical connection 78 may be on the back side of the display panel and may be a socket to connect with the computing unit panel without passing to the interior of the bag. Also shown are display panel prop holder 87, such as a receptacle, socket, dip or pivoting holder, designed to match a prop holding the display panel in at least one angular position relative the bag front. These may be sockets, ridges, a holder for a prop or other means to facilitate the positioning of the prop and propping of the display panel in positions relative to the bag front.

To improve access from the bag interior cargo area 73 to the computing unit panel, an interior access coupling may be included. This coupling includes matching parts on the computing unit panel and the bag 1 which allow the physical and/or electrical connection of the CU panel to computer equipment held in the interior of the bag. In one variation, shown in exploded view FIG. 4, the interior access coupling aligns and provides access to controls, electrical plugs/sockets and peripheral mounts on the back surface of the computing unit panel (CU panel), by employing an opening 6 in the bag front wall 3 adjacent to the back surface of the CU panel when held in the computing unit panel holder 5. The opening may be large enough to expose a substantial part of the CU panel back surface so that connections can be made easily.

The bag interior access coupling is located on the bag front wall 3 adjacent to the computer panel holder 5 so that it may be engaged while the CU panel 11 is in the computing unit holder. The bag front opening has a bag part interior access coupling 7 which may form a rim around the opening. The coupling may have fixtures such as attachments 8, seal and/or alignment structures, facing and matching the CU panel's back surface. The coupling thus serves to align the bag to the CU panel back surface controls and connections, to secure the CU panel in the holder and to the bag front, to reinforce the edge of the opening and to keep objects in the bag from wedging between the bag front and CU panel back surface. Also shown is the bag's attachment flap 83 which may include an electrical access opening or channel 117 through layers of the attachment flap. There may be an electrical access opening 80 in the bag front wall and this may be positioned to allow an electrical connection to pass through the bag front wall. It may be aligned with the electrical access opening or channel in the attachment flap.

Figures 4, 5:
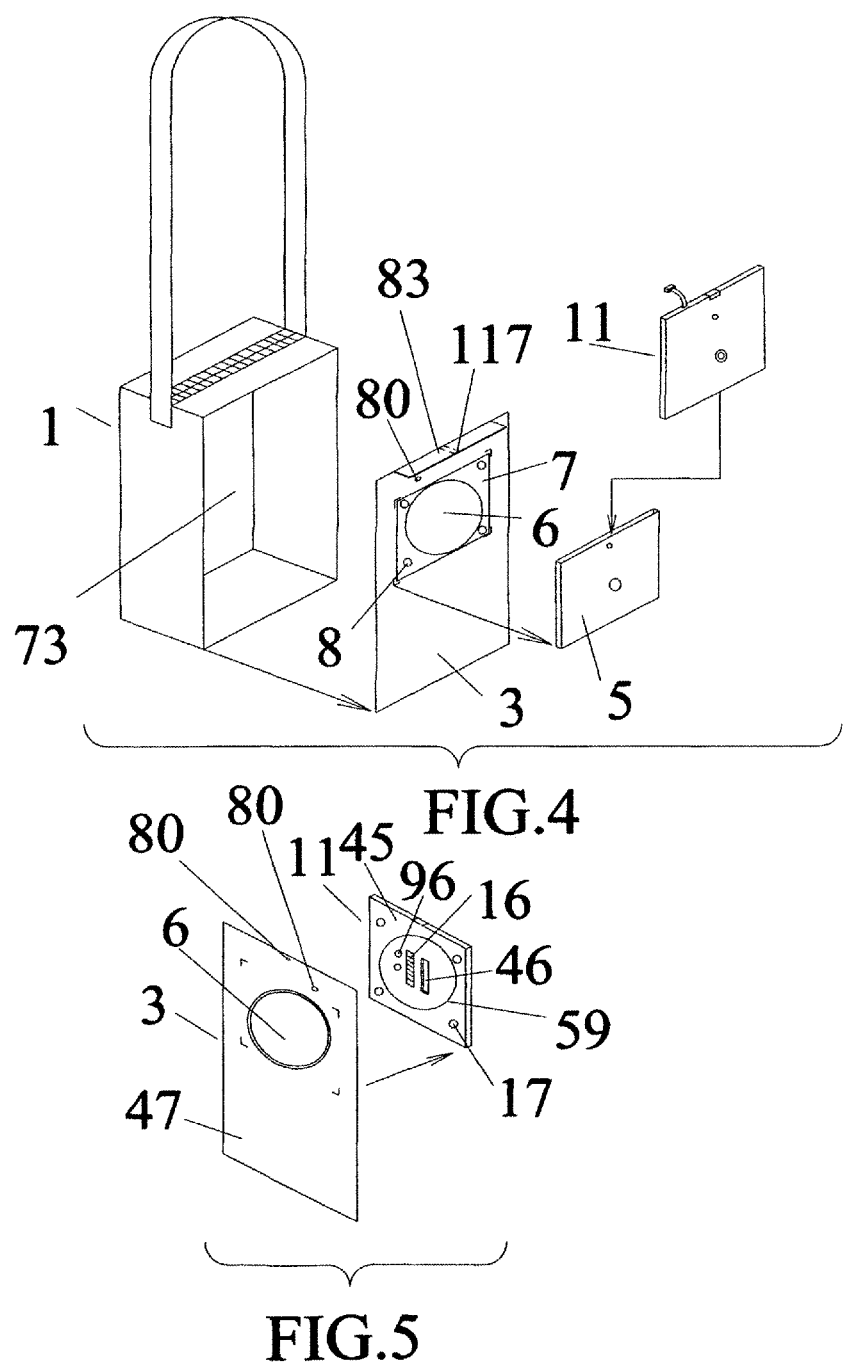
FIG. 4 This is an exploded view of the bag computer with detail of the front side of the bag front wall including an interior access opening.
FIG. 5 Here is the back side of the bag front wall and computing unit panel as adapted for a front wall interior access opening.

Shown in FIG. 5, a view of the bag front wall inside surface 47 and CU panel back surface, the CU panel 11 back surface 45 may have fixtures such as controls 96, electrical connection plugs or sockets 16 and/or peripheral mounts 46. On the CU panel back surface there is a computer part interior access coupling 59 matching the bag's coupling, including attachments 17 and/or alignment structures, to align and secure the CU panel to the bag front wall 3 opening 6 while it is held by the computing unit panel holder. There may be separate electrical access openings 80 for electrical attachment of the display panel.

To install the CU panel to the bag, the CU panel is attached to the computing unit holder. The bag part interior access coupling is engaged to the matching computer part interior access coupling on the CU panel back surface. In this way, the CU panel is securely held in the holder and there is access to controls, electrical plugs, sockets and/or peripheral mounts from the interior cargo area of the bag where these items may be held.

Figure 6:
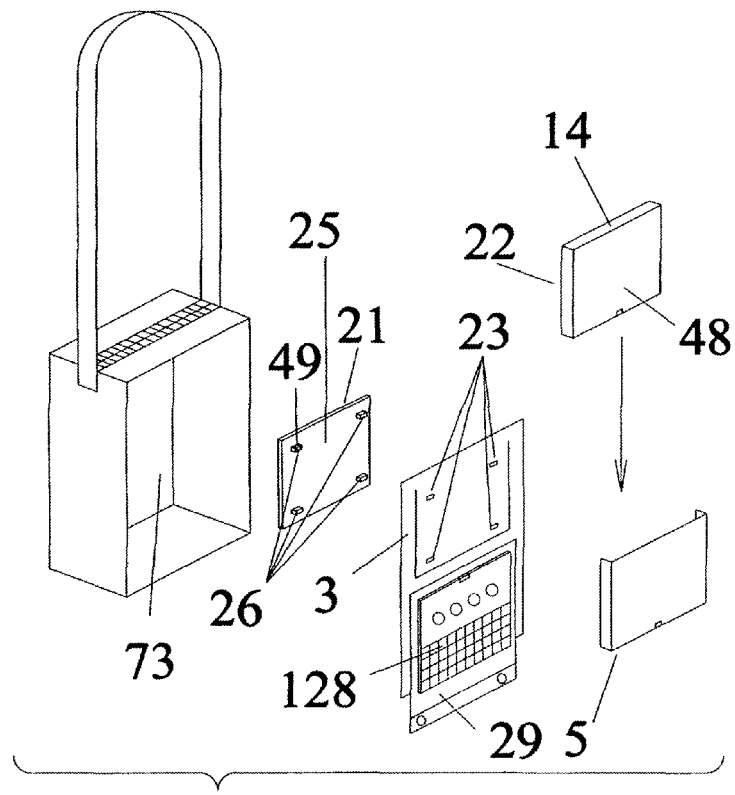
FIG. 6 This is an exploded view of the bag computer with detail of the front side of the bag front wall including a front computing unit panel part attached to a back computing unit part with attachments passing through the bag front wall.

Shown in exploded view FIG. 6, an alternative way to provide interior access to controls, electrical plugs/sockets, peripherals and peripheral mounts on the back surface of the CU panel, the interior access coupling is comprised of the CU panel being divided into a back CU panel part 21 and a front CU panel part 22 which may be attached together with matching attachments through a pattern of holes 23 in the bag front wall 3. The two CU panel parts may be attached, clamping the bag front wall between them. The matching attachments and bag holes also serve to secure the CU panel to the bag and in computing unit panel holder, to align the parts, and to physically and electrically connect the front and back CU panel parts. This arrangement allows connection from the CU panel to peripherals, batteries, or other tools held in the bag's interior cargo area 73.

The bag interior access coupling is comprised of a pattern of holes located on the bag front wall 3 adjacent to the computing unit panel holder 5 so that it may be engaged to CU panel in the holder. The holes may be trimmed, with stitching or grommets for example, to strengthen them.

The front CU panel part has a front surface 48. There is an opposite back surface, a top surface 14 and connecting side surfaces. The back surface of the front CU panel part has attachments such as plugs and/or sockets to match and attach to attachments 26 from the back CU panel part. The area around the attachments may be shaped to fit the bag front material.

There may be an electrical connection 49 to electrically connect the front CU panel part and back CU panel part, and this electrical connection may be combined with attachments found on the front side 25 of the back CU panel part and/or on the back side of the front CU panel part. There may be an electrical connection 127 (FIG. 7) connecting the CU panel to a keyboard 128 mounted to the cover 29.

Figure 7:
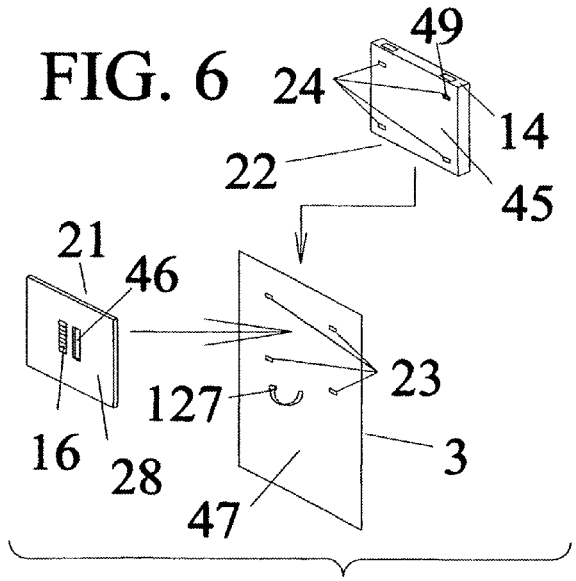
FIG. 7 Here is the back side of the bag front wall including a front computing unit panel part attached to a back computing unit part as adapted to attach through the bag front wall.

Shown in FIG. 7, a view of the inside surface 47 of the bag front wall and back of the CU panel, the back CU panel part 21 has a front surface adjacent to the inside surface of the bag front wall when installed, an opposite back surface 28 and connecting sides. The back CU panel part back surface or connecting sides may have fixtures such as controls, peripheral mounts 46, electrical plugs/sockets 16 or other physical or electric connections to allow connection to peripherals, batteries, or other tools held in the bag's interior cargo area.

The front surface of the back CU panel part has attachments, such as plugs and/or sockets, to match and attach to the attachments 24 on the back surface 45 of the front CU panel part 22 to physically and electrically connect them and the bag through the pattern of holes 23 in the bag's front wall 3 which comprises the bag part interior access coupling. There may be an electrical connection 49 on the back side of the front CU panel part and this may be included in the attachments. The area around the attachments may be shaped to fit the bag front material. The attachments may include locks to secure the complimentary attachments parts together and may also include release mechanisms to disengage and detach the back body part from the front body part.

Figure 8:
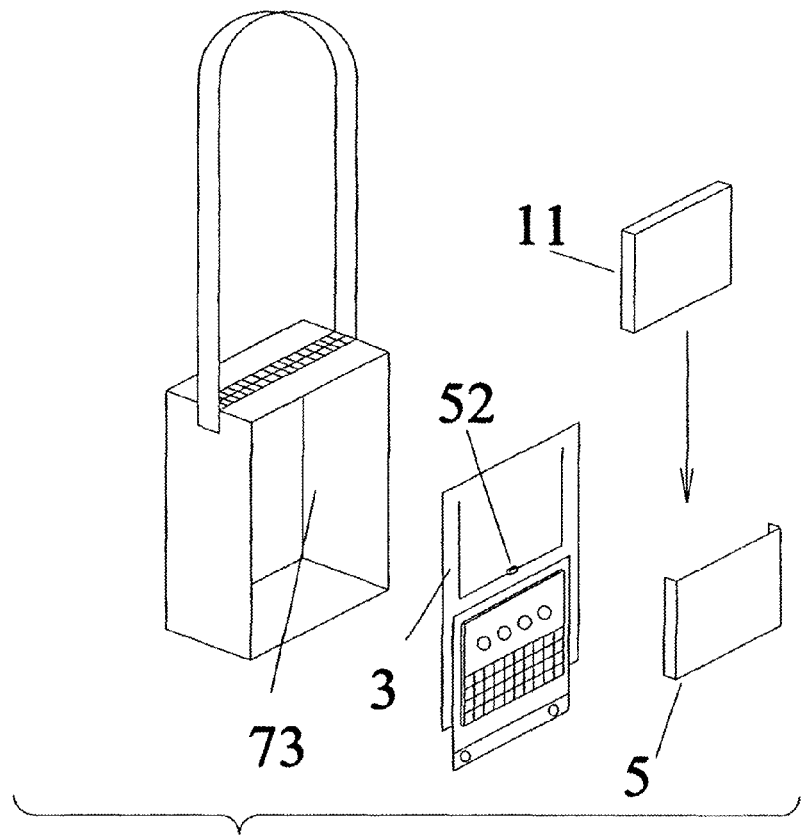
FIG. 8 This is an exploded view of the bag computer with detail of the front side of the bag front wall including an electrical connection for connecting the computing unit panel and an inside mounted connection box.

In another variation, shown in exploded view FIG. 8, the interior access coupling provides access to CU panel controls, electrical plugs, sockets and peripheral mounts by employing a bag front wall 3 electrical connection 52, which comprises the bag part interior access coupling, connectable to the back surface of the matching the CU panel 11 when held in the computing unit panel holder 5. The bag interior access coupling is located on the bag front wall 3 positioned to the computing unit panel holder 5 so that it is aligned with and may be engaged while the CU panel is held by the holder. This arrangement allows connection from the CU panel to peripherals, batteries, or other tools held in the bag's interior cargo area 73.

Figure 9:
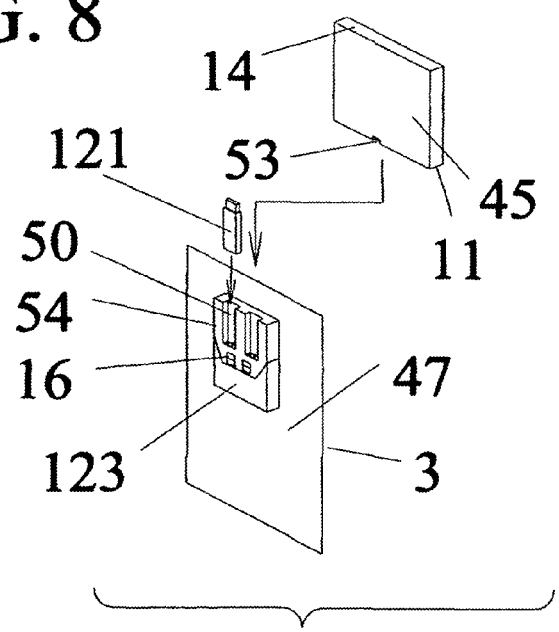
FIG. 9 Here is the back side of the bag front wall including the computing unit panel and connection box adapted to electrical connection through the bag front wall.

Shown in FIG. 9, a view of the inside surface 47 of the bag front wall and back side of the CU panel, the bag part interior access coupling, in this case a front wall electrical connection, is positioned on the exterior of front wall so it may be engaged to a matching CU panel electrical connection 53, constituting the computer part interior access coupling, on the CU panel 11 when it is installed to the computing unit panel holder. For example, the CU panel electrical connection may be near the bottom of the CU panel back surface 45 and the matching bag front wall electrical connection may be near the bottom inside of the computing unit holder. The electrical connection on the bag front wall leads though the bag front wall and to the interior of the bag.

To facilitate the connection of peripherals or other computer equipment on the inside of the bag, the bag part interior access coupling may further comprise a connection box 54 attached to the inside surface 47 of the bag front wall 3 and electrically connected to the bag front all electrical connection. The connection box may include controls, electrical plugs/sockets 16, recessed mounts 50 for computer equipment 121 such as peripherals, removable memory or other equipment to be electrically connected to the CU panel. The connection box may be attached to the bag with riveting, sewing, gluing or other bonding process. The connection box may be attached directly to the inside of the bag front wall with, for example, rivets or glue. Instead, the bag may include an inside mounting structure 123 on the inside surface of the bag front wall and adapted to hold the connection box, inside mounted CU panel or other computer equipment. The connection box may be positioned and shaped to be a rigid support for the bag front wall and computer equipment storage area on the outside of the bag front and, thus, assist in storing the display panel in its storage position.

To install the CU panel to the bag, the CU panel is inserted into the computing unit holder, in this case from the top. As the CU panel is installed, the electrical connection engages with the bag front wall electrical connection to provide electrical access from the CU panel to the bag interior and any connection box mounted to the inside surface of the bag's front wall.

FIGS. 10A, 10B and magnified 10C show how the CU panel and display panel may be provided with fixtures to form an angular support assembly which may be used to assist in holding more than one angular position of the display panel relative to the bag front wall.

In one type of angular support assembly capable of holding the display panel in an angular position, the display panel 12 may include a display panel extension 89 fixed to the display panel near the attachment edge 38 (also called attachment axis) and extending between the display panel and CU panel 11, the bag front wall 3, the holder, a receptacle or other object when in an operating position. The extension may be designed to rub against and temporarily adhere to the front surface 33 of the CU panel while the CU panel is attached to the bag in the holder 5. With the display panel suspended and held in place by a free section 103, the display panel may be propped with the display panel extension in a variety of operating position angles relative to the bag front. In this way the display panel user may select a viewing angle. The extension on the attachment axis may also be called a prop or leg and there may be two or more extensions, props or legs.

The extension end 106 may have a gripping feature 91 to assist in temporarily holding the extension to the CU panel front surface, contact surface, holder front, receptacle or bag front wall. The bag front wall or the front surface of the CU panel, holder or receptacle may include a contact surface 90 to temporarily adhere to the display panel extension or its gripping feature. The contact surface may be rigid or flexible. The contact surface may be have a textured surface suited to adhering to the extension end. The area of the bag near the contact surface may be reinforced with, for example, extra bag material. There may be two or more contact surfaces. The gripping feature and contact surface may include or be complimentary features such as pin and socket, matching ledges or matching teeth, matching magnets or hook and loop, for example.

There may be one display panel extension along part of or all of the attachment edge. There may be more than one extension with, for example, one part toward the right side edge of the display panel and a second part toward the left side edge of the display panel.

The extension end or gripping feature may match the contact surface and is designed to temporarily hold the display panel to the contact surface, the bag front or the front surface of the CU panel as the free section 103, in this case a flexible fabric attachment flap 83, suspends the display panel at one or more angles relative to the bag front. The word "suspend" in this sense means to hold the display panel from falling due to the force of gravity, including toppling while the display panel extension is pressed against the bag front. In the case of a rigid free section, compression support may additionally be provided to assist in holding the display panel in place. The free section has a proximal end 118 attached at the upper boundary of the computer equipment storage area near the top end of the front wall and a distal end 119 attached to the display panel near the attachment axis. The free section may also be called a retainer because it holds the display panel in place on the bag or CU panel. The positioning of the extension end on the contact surface, CU panel or bag front decides the display panel angle.

The free section may be attached to the bag at or near the upper boundary of the computer equipment storage area and pivots on a first axis 101 parallel to the junction of the top and front walls. In the case of and attachment flap, it has a free section 103 and, optionally, a distal section 104 which may be use for attachment of the flap to the display panel. At the end of the free section distal to the bag or between the free section and the distal section there is a second axis 102, also parallel to the junction. This axis is also called the display panel attachment axis 38. With the attachment of the display panel to the bag on or near the attachment axis, the back side of the display panel is available to the operator's fingers for the use of controls found there.

The edge of the display panel attachment edge may be concealed by the display panel extension, especially in the case where the extension is on the plane of the display panel and extends along the entire attachment edge of the display panel. In this case the attachment edge 38 may also be called the display panel attachment line 38 or attachment axis 38.

The top end 14 of the CU panel may be designed to abut the free section 103 attachment area to the bag 1 to assure that the CU panel 11 does not move up or the upper part of the bag front wall does not fold, crumple or otherwise distort from the upward pressure of the extension end caused by the weight of the display panel when it is propped in an operating position. Depending on the shape of the top end of the CU panel, the free section may include additional angles where it touches the CU panel top end. Therefore the first axis may be located at the touching point of the CU panel and the free section. There may be a proximal section (see 130—FIG. 27) of the free section extending from the attachment to the bag to the proximal end of the free section where the first axis is located.

In an alternative or complimentary means to hold display panel angular position, a movable display panel prop may be used. The prop 88 may be located on the computing unit panel with one or more display panel prop holder 87, such as a receptacle, socket, clip or pivoting holder. The fixture may hold the prop and allow it to pivot or may be adapted to hold a prop end temporarily while propping is done. The display panel back side may have a prop holder (see FIG. 3, 87) to hold a prop or prop end in order to span between the CU panel and display panel back side and maintain an angular position of the display panel relative to the bag front.

Shown in FIG. 11, the free section 103 may be a shaped attachment flap connecting the display panel to the bag 1. In this case, the attachment flap is tapered 110 to a point attaching to the display panel as an attachment point 108 (rather than an attachment edge or attachment line) located on the second axis on the display panel 12. In this way the display panel may pivot on a third axis 115 perpendicular to the bag front wall and the display panel may be viewed from side angles without moving the bag. Also shown is that the extensions/legs/props 89 may be shaped to match the free section attachment flap so that when the display panel is in the storage position the flap fits between the extensions. The attachment point may be attached to the display panel at the attachment axis 102 and away from the bag front wall 3, for example, on or near the plane front side 36 of the display panel. This forces the free section attachment flap to stay between the extensions and stabilizes the display panel when in the storage position. In this way the flap may assist holding the display panel in the storage position and in keeping the display panel from swinging side to side. Whether the free section is attached to an attachment point or attachment line, various shaping of the extensions and free sections may be imagined to stabilize the display panel.

Alternatively, as shown in FIG. 12, the free section may be shaped to attach to the attachment edge of the display panel and removably attached to an attachment point 108a located on the first axis on the bag. Also shown are the CU panel 11 and its holder 5.

Shown in FIG. 13, the free section may be reduced to a filament 109 holding the display panel 12 to the bag 1. The filament may be a cord, line, strand, wire, belt, electrical cable, strap, chain or other linear attachment. It may be flexible or rigid. The filament may attach to the bag at the first axis attachment point and to the display panel at the second axis attachment point. This arrangement allows the display panel to pivot on the third axis 115. The tapered attachment flap or the filament may include an electrical connection. The CU panel 11 or holder 5 may include one or more display panel stops 111 to stop the display panel from moving to the sides while stored. The filament may also be an electrical connection between the display panel and the bag interior, the CU panel or to an interior mounted connection box or CU panel. Also shown in this figure is that one or more contact surfaces 90 may be located on the CU panel holder 5 instead of on the CU panel.

FIG. 14 shows that the filament 109 can lead directly from the display panel 12 to the CU panel 11 instead of from the display panel to the bag 1. The filament may also be an electrical connection.

Figure 15:
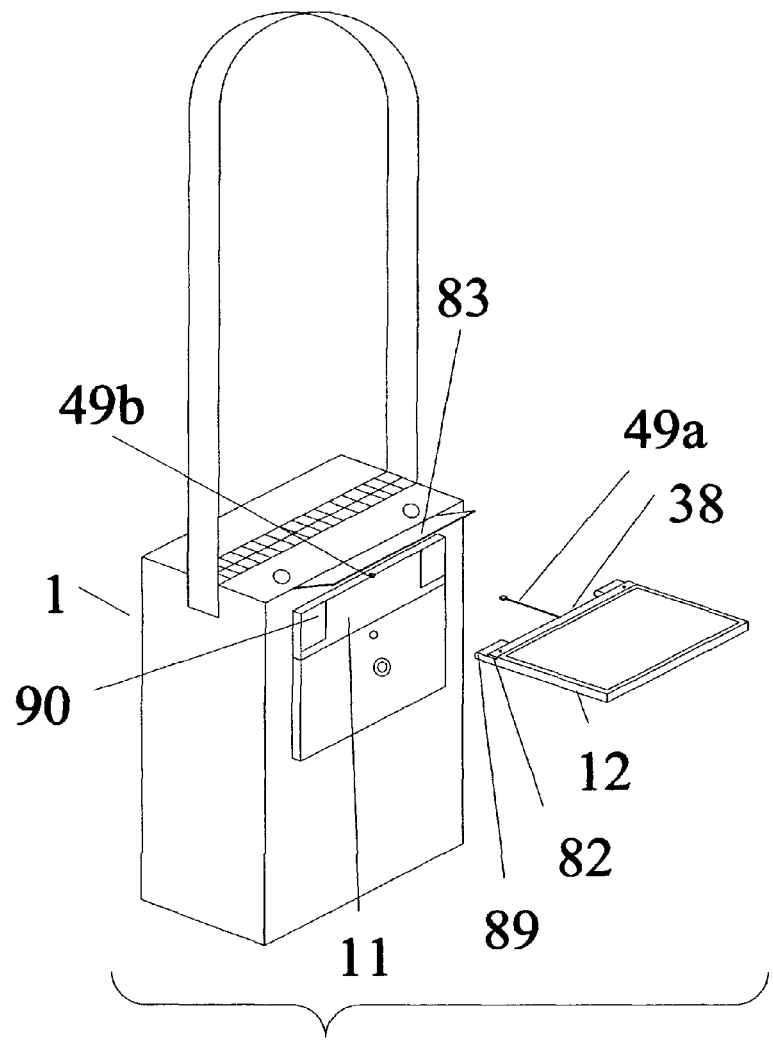
FIG. 15 This shows a way to electrically connect the display panel to the computing unit panel where a display panel angular support assembly is used.

FIG. 15 shows that there may be an electrical connection from an electrical fixture 49a on the display panel 12 to an electrical fixture 49b on the CU panel 11. The connection may pass through an opening or channel in the attachment flap. As shown, the angular support assembly display panel extension 89 has two parts, props or legs which are to the sides of the display panel so they do not pinch the electrical connection. The two legs match two contact surfaces 90. The attachment edge 38 is shown with clamp jaws 82 designed to hold the display panel to the bag's 1 attachment flap 83.

FIGS. 16A and 16B show more detail how the display panel 12 and contact surface 90 work to support the display panel is various angular positions relative to the bag 1 front wall 3. Here, the display panel is shown in a storage position. The display panel is parallel to the bag front wall and the free section 103 and extension 89 are not taking a load.

Shown in FIGS. 17A, 17B and 17C, the display panel is in an operating position. The display panel 12 is held an angle relative to the bag front wall with the extension 89 against the bag 1 front wall 3 or contact surface 113 and the free section 103 suspending the display panel. The display panel extension (also called a leg or prop) may have a gripping feature 91 and this may match a contact surface 90 gripping feature 90a. The contact surface may be attached to the bag front wall, may be rigid or be made of material with enough body to hold the shape of the front wall. Its top end 113 may abut the free section 103 attachment area to the bag 1 to assure that the bag front wall 3 does not fold, crumple or otherwise distort from the upward pressure of the extension end caused by the weight of the display panel. The contact surface may be have a textured surface suited to adhering to the extension end, may be made of belting which may be in long vertical strips to spread the load of the display panel over the bag front.

FIGS. 18A and 18B show an embodiment with a different type of free section 103. The display panel 12 extension 89 end 106 proximal to the CU panel or bag front may be used to rub against the CU panel 11, bag front or a contact surface 90 on the CU panel or bag front. In this case the free section 103 may be a filament, bar, wire, electrical connection, strap or other linear feature which may be rigid or flexible. It is pivotally or flexibly attached to the bag, holder or receptacle, where it forms a first axis 101 and attaches to the display panel at the right side edge and left side edge thus forming the second axis 102. The second axis is also called the attachment axis. In this way the display may extend onto the display panel extension without being blocked by an attachment flap.

Also shown is that the prop 88 or a prop holder 87 may be mounted to the computing unit panel holder 5 instead of the CU panel.

FIGS. 19A, 19B (magnified view) and 19C show that the display panel may be pivotally attached directly to the CU panel with the display 18 on the display panel 12 front side facing away from the CU panel front side 33 when the two panels are stored beside and approximately parallel to each other when separated from the bag and its holder. When mounted in the bag's holder 5, holder material may be between the display panel and CU panel. In this way a two panel computer suitable for use on a bag front may be formed. The computing unit may be located in the display panel or in the CU panel or in both. The CU panel may be reduced to a just a panel with no electronics and be used for mounting and propping the display panel. The characteristics, principles of operation and features of the display panel extension and angular support assembly previously described (axes, free section parts, etc.) can be also applied when the CU panel 11 and display panel 12 are attached directly without the bag. This allows the display panel to be held at various operating position angles relative to the CU panel. The contact surface 90 may be attached to the CU panel instead of the bag. The CU panel and the display panel may be pivotally attached with a free section 103, in this case a flexible fabric flap or sheet 83, which connects free section proximal end to the CU panel with an attachment, such as a CU panel two jaw clamp 94 or other attachment means, and the free section distal end to the display panel with an attachment, such as a display panel clamp 95. The drawing shows that the display panel prop 88 may be attached to the CU panel.

Shown in FIG. 19C, the combined CU panel and display panel including the PCEM attaching them and the free section and extension forming the angular support assembly may be removed from the bag holder for use on another venue such as a desk, for example.

FIG. 20 shows that the combined CU panel and display panel may be used in other venues such as on a table 124, or mounted to other objects, shown in FIG. 21, such as a wall 125, using a holder 5 which is attachable to the object and matches and removably fits the CU panel. There may be an electrical connection 49 between the CU panel and the display panel and this connection may be located between two layers of attachment flap 83 or free section material or may be located in a filament pivoting computer equipment mount.

FIGS. 22A and 22B show the display panel 12 in storage position with the display panel approximately parallel to the plane of the computing unit panel. FIGS. 23A and 23B show the display panel in a horizontal operating position with the display panel at a 90 degree angle relative to the plane of the computing unit panel. The free section 103 may join the CU panel at or near a first axis 101 near the top end of the CU panel and join the display panel at a second axis 102 (the attachment axis). FIGS. 24A and 24B show the display panel in a vertical operating position. In FIGS. 22A and 22B, a display panel storage position attachment 92, such as a hook or ledge, serves to hold the display panel in the storage position by hanging to a complimentary attachment 114 on the CU panel. This attachment may be found on the upper edge of the contact surface 90 nearest the top end 35 of the CU panel. The two complimentary attachments function by taking the display panel weight off the free section 103 and allows the distal end of the display panel to rest against the CU panel 11 front surface 33 or the bag's CU panel holder in a storage position. The display panel is held to the CU panel with the free section which may be a flexible fabric attachment flap attached to the display panel using a clamp attachment 95 on the display panel.

In FIGS. 24A and 24B, a display panel vertical position attachment 93, such as a hook or ledge, serves to hold the display panel in the vertical operating position by attaching to a complimentary attachment 115 on the CU panel. This attachment may be found on the lower edge of the contact surface 90 distal to the top end 35 of the CU panel. The two complimentary attachments function to hold the display panel in the vertical operating position where the operator may view the display from in back of the bag.

The free section 103, contact surface 90, bumper 86 and display panel extension 89 may be adapted to create a gap 27 between the display panel back side and the CU panel front side so that CU panel holder material or prop can fit between the two panels while still allowing the display panel to move into its storage position approximately parallel to the CU panel front surface or the bag's CU panel holder.

Shown in FIGS. 25A, 25B, 26A and 26B, the same, arrangement of display panel 12, free section 103 with first axis 101 and second axis 102, contact surface 90, display panel extension 89, display panel storage position attachment 92 and complimentary attachment 114, display panel vertical position attachment 93 and complimentary attachment 115 may be used in other venues. For example, the extension may temporarily adhere to the bag 1 front wall 3 (FIGS. 25A and 25B) or contact surface 90 on the bag front while display panel is suspended by the free section.

Alternatively (FIGS. 26A and 26B), the CU panel may be or may include a receptacle for holding the display panel and the extension may temporarily adhere to the front 126 of a receptacle 116 or holder front or to a contact surface 90 on the holder or receptacle while the free section suspends the display panel in an operating position. The receptacle 116 may be designed to slidably receive the display panel. The free section used with the receptacle may be a filament.

FIG. 27 shows that the receptacle 116 or holder for use with a display panel 12 angular support assembly, as in FIGS. 26A and 26B, may be separate from the bag so it may be mounted to some other object or used without mounting.

FIG. 27 (receptacle shown in side view cross section) and 28 illustrate how the receptacle may be used to store the display panel to a bag or other object. The display panel 12 may slide from a storage position on the inside 129 of the receptacle 116 to an operating position by sliding upward and then pivoted forward into an operating position. The free section 103 pivots at a first axis 101 as with the free section attached to a bag or to a CU panel. However, a proximal section 130 may extend from free section proximal end 118 to the bag, receptacle or holder to hold the display panel to the bag or receptacle at a more suitable position.

FIGS. 29A and 29B are reminders that two free sections 103 attached to the right side edge 40a and left side edge 40b of the display panel 12 may be used instead of one free section to attach the display panel to the CU panel 11, receptacle, holder or other object. The display may, then, extend over the extension. The free sections may attach to the CU panel at or near the first axis 101 and to the display panel at the attachment axis 102. The end of the display panel extension 89 presses against the contact surface 90 to hold the display panel at an operating angle.

In FIGS. 30A, 30B, and 30C, the PCEM, including an angle 131 formed at the first axis and the free section 103, includes a spring, such as a flexible and elastic spring steel sheet, wire, band, elastic plastic or similar material, which allows pivoting of the display panel from the storage position beside the CU panel to an operating position. The spring may form angle at the first axis. The spring is elastic and provides the pressure to press and hold the display panel extension to the CU panel. The second axis 102 is located on the display panel as usual. Here, the spring and axis are attached to a CU panel 11. Instead, the PCEM may be attached to a bag front, a holder or a receptacle.

In FIGS. 31A, 31B, and 31C, the free section is a spring 103a that may be attached to the CU panel 11, bag, or receptacle. A spacer block 132 may also be included to provide a gap between the free section and CU panel front large enough for the display panel to fit between them when in storage position. The flex in the spring provides the angle change (pivoting) that would usually be performed by the first axis in the display panel 12 angular support assembly.

In FIGS. 30 and 31, because the free section spring is more rigid than a flexible fabric free section, the spring may hold the angle between the display panel and CU panel by both suspending (tinsel load) and supporting (compression load) the display panel depending on the angle involved.

The invention claimed is:

1. An electronic computing device for mobile use comprised of:
    a. a bag comprised of an interior cargo area and a front wall including an outside surface with a computer equipment storage area and a top end;
    b. a computing unit panel attached to the bag front wall in the computer equipment storage area;
    c. a display panel including a front side, a back side, a right side edge, a left side edge, an attachment axis and an extension fixed to the display panel near the attachment axis; and
    d. a pivoting computer equipment mount attaching the bag to the display panel, the pivoting computer equipment mount comprised of a free section including a proximal end attached to the bag at an upper boundary of the computer equipment storage area and a distal end attached to the display panel at the attachment axis, wherein the pivoting computer equipment mount allows the display panel to pivot from a storage position to an operating position and suspends the display panel while the display panel extension props the display panel in one or more operating positions.

2. The computing device of claim 1, wherein the back side of the display panel is further comprised of a pointing device.

3. The computing device of claim 2, wherein the display panel is further comprised of a finger guide configured to guide a finger to the pointing device on the back side of the display panel.

4. The computing device of claim 1, wherein the computing unit panel is further comprised of one of a contact surface and a display panel prop.

5. The computing device of claim 1, wherein the free section is one of an attachment flap and a filament.

6. The computing device of claim 1, wherein the free section is attached to an attachment point located on one of the display panel and the bag, wherein the display panel may pivot on a third axis.

7. The computing device of claim 1, wherein the free section distal end is attached to the display panel attachment axis at one of the display panel right side edge and the display panel left side edge.

8. The computing device of claim 1, wherein the bag is further comprised of a computing unit panel holder attached to the bag in the computer equipment storage area, the holder configured to attach the computing unit panel to the bag.

9. The computing device of claim 8, wherein the computing unit panel holder is further comprised of one of a contact surface and a display panel prop.

10. The computing device of claim 1, wherein the bag is further comprised of a cover attached at a bottom of the computer equipment storage area, the cover positioned and oriented to cover and uncover the computer equipment storage area.

11. The computing device of claim 1, further comprising an electrical connection from the display panel to the computing unit panel.

12. The computing device of claim 1, further comprising an electrical connection from the computing unit panel to an interior cargo area.

13. The computing device of claim 1, further comprising an electrical connection from the display panel to an interior cargo area.

14. The computing device of claim 1, wherein the bag is further comprised of an interior access coupling comprised of a bag part interior access coupling on the bag and a computer part interior access coupling on the computing unit panel, wherein the interior access coupling is configured to allow one of a physical connection and an electrical connection between the computing unit panel and computer equipment stored in the interior cargo area of the bag.

15. The computing device of claim 1, wherein the display panel is further comprised of a vertical position attachment and one of the computinq unit panel and the bag is further comprised of an attachment complimentary to the vertical position attachment.

16. The computing device of claim 1, wherein the display panel is further comprised of a storage position attachment and one of the computing unit panel and the bag is further comprised of an attachment complimentary to the storage position attachment.

17. The computing device of claim 1, wherein the computing unit panel is a receptacle for holding the display panel in a storage position.

18. The computing device of claim 1, wherein display panel extension presses against one of the computing unit panel and the bag to prop the display panel.

19. An electronic computing device for mobile use comprised of:
 a. a computing unit panel;
 b. a display panel including a front side, a back side, a right side edge, a left side edge, an attachment axis and an extension fixed to the display panel near the attachment axis; and
 c. a pivoting computer equipment mount attaching the computing unit panel to the display panel, the pivoting computer equipment mount comprised of a flexible fabric free section including a proximal end attached to the computing unit panel and a distal end attached to the display panel at the attachment axis, wherein the pivoting computer equipment mount allows the display panel to pivot from a storage position to an operating position and suspends the display panel while the display panel extension presses against the computing unit panel and props the display panel in one or more operating positions.

20. The computing device of claim 19, wherein the computing unit panel is further comprised of one of a contact surface and a display panel prop.

21. The computing device of claim 19, wherein the free section is one of an attachment flap and a filament.

22. The computing device of claim 19, wherein the free section is attached to an attachment point located on one of the display panel and the bag, wherein the display panel may pivot on a third axis.

23. The computing device of claim 19, wherein the free section distal end is attached to the display panel attachment axis at one of the display panel right side edge and the display panel left side edge.

24. The computing device of claim 19, wherein the back side of the display panel is further comprised of a pointing device.

25. The computing device of claim 24, wherein the display panel is further comprised of a finger guide configured to guide a finger to the pointing device on the back side of the display panel.

26. The computing device of claim 19, further comprising an electrical connection from the display panel to the computing unit panel.

27. The computing device of claim 19, wherein the display panel is further comprised of a vertical position attachment and the computing unit panel is further comprised of an attachment complimentary to the vertical position attachment.

28. The computing device of claim 19, wherein the display panel is further comprised of a storage position attachment and the computing unit panel is further comprised of an attachment complimentary to the storage position attachment.

29. The computing device of claim 19, wherein the computing unit panel is a receptacle for holding the display panel in a storage position.

30. The computing device of claim 19, further comprising a bag comprised of a front wall including a computing unit panel holder, wherein the computing unit panel holder holds the computing unit panel to the bag.

31. The computing device of claim 19, wherein the pivoting computer equipment mount is further comprised of an angle formed at a first axis, wherein the angle is a spring, the spring providing pressure to hold the display panel extension to the computing unit panel when in an operating position.

32. The computing device of claim 19, wherein the free section is a spring attached to the computing unit panel, the spring providing pressure to hold the display panel extension to the computing unit panel when in an operating position.

33. The computing device of claim 19, further comprising a computing unit panel holder, wherein the computing unit panel holder holds the computing unit panel to an object.

34. The computing device of claim 8, wherein display panel extension presses against the computing unit panel holder to prop the display panel.

35. An electronic computing device for mobile use comprised of:
 a. a bag comprised of an interior cargo area and a front wall including an outside surface with a computer equipment storage area and a top end;
 b. a computing unit panel attached to the bag front wall in the computer equipment storage area;
 c. a display panel including a front side, a back side, a right side edge, a left side edge and an attachment axis; and
 d. a pivoting computer equipment mount attaching the display panel to the bag, wherein the pivoting computer equipment mount allows the display panel to pivot from a storage position in the computer equipment storage area to one or more operating positions.

36. The computing device of claim 35, wherein the back side of the display panel is further comprised of a pointing device.

37. The computing device of claim 36, wherein the display panel is further comprised of a finger guide configured to guide a finger to the pointing device on the back side of the display panel.

38. The computing device of claim 35, further comprised of a display panel prop between the display panel and one of the bag and the computing unit panel.

39. The computing device of claim 35, wherein the pivoting computer equipment mount is one of an attachment flap and a filament.

40. The computing device of claim 35, wherein the pivoting computer equipment mount is attached at an attachment point located on one of the display panel and the bag, wherein the display panel may pivot on a third axis.

41. The computing device of claim 35, wherein the pivoting computer equipment mount is attached to the display panel attachment axis at one of the display panel right side edge and the display panel left side edge.

42. The computing device of claim 35, wherein the bag is further comprised of a computing unit panel holder attached to the bag in the computer equipment storage area, the holder configured to attach the computing unit panel to the bag.

43. The computing device of claim 35, wherein the bag is further comprised of a cover attached at a bottom of the computer equipment storage area, the cover positioned and oriented to cover and uncover the computer equipment storage area.

44. The computing device of claim 35, further comprised of an electrical connection from the display panel to the computing unit panel.

45. The computing device of claim 35, further comprised of an electrical connection from the computing unit panel to the interior cargo area.

46. The computing device of claim 35, further comprised of an electrical connection from the display panel to the interior cargo area.

47. The computing device of claim 35, wherein the bag is further comprised of an interior access coupling comprised of a bag part interior access coupling on the bag and a computer part interior access coupling on the computing unit panel, wherein the interior access coupling is configured to allow one of a physical connection and an electrical connection between the computing unit panel and computer equipment stored in the interior cargo area of the bag.

48. The computing device of claim 35, wherein the computing unit panel is comprised of a front computing unit panel part with attachments matching attachments on a back computing unit panel part, the attachments configured to allow one of a physical connection and electrical connection between the two parts and computer equipment stored in the interior cargo area of the bag, wherein the two parts are configured to attach through a pattern of holes in the bag front wall.

49. The computing device of claim 35, wherein the display panel is further comprised of a vertical position attachment and one of the computing unit panel and the bag is further comprised of an attachment complimentary to the vertical position attachment.

50. The computing device of claim 35, wherein the display panel is further comprised of a storage position attachment and one of the computing unit panel and the bag is further comprised of an attachment complimentary to the storage position attachment.

51. The computing device of claim 35, wherein the computing unit panel is a receptacle for holding the display panel.

52. The computing device of claim 35, wherein the display panel is pivotally attached to the bag near the top end of the front wall.

53. The computing device of claim 35, wherein the display panel front side is further comprised of a display and the display faces away from the bag front wall when the display panel is in the storage position.

54. The computing device of claim 19, wherein the free section proximal end is attached near one of an end of the computing unit panel and a top end of the computing unit panel.

55. The computing device of claim 19, wherein the computing unit panel is a panel with no electronics

\* \* \* \* \*